United States Patent
Komatsuzaki et al.

(10) Patent No.: US 11,634,530 B2
(45) Date of Patent: Apr. 25, 2023

(54) METHOD FOR MANUFACTURING ARTIFICIAL LEATHER

(71) Applicant: DIC Corporation, Tokyo (JP)

(72) Inventors: Kunihiko Komatsuzaki, Osaka (JP); Shingo Takeda, Osaka (JP); Yoshinori Kanagawa, Osaka (JP); Toyokuni Fujiwara, Osaka (JP)

(73) Assignee: DIC CORPORATION, Tokyo (JP)

(*) Notice: Subject to any disclaimer, the term of this patent is extended or adjusted under 35 U.S.C. 154(b) by 522 days.

(21) Appl. No.: 16/649,067

(22) PCT Filed: Aug. 9, 2018

(86) PCT No.: PCT/JP2018/029887
§ 371 (c)(1),
(2) Date: Mar. 19, 2020

(87) PCT Pub. No.: WO2019/058804
PCT Pub. Date: Mar. 28, 2019

(65) Prior Publication Data
US 2020/0262964 A1 Aug. 20, 2020

(30) Foreign Application Priority Data
Sep. 25, 2017 (JP) .............................. JP2017-183663

(51) Int. Cl.
| | |
|---|---|
| *C08G 18/12* | (2006.01) |
| *B32B 27/40* | (2006.01) |
| *B32B 37/00* | (2006.01) |
| *C08G 18/40* | (2006.01) |
| *C08G 18/42* | (2006.01) |
| *C08G 18/48* | (2006.01) |
| *C08G 18/76* | (2006.01) |
| *C08J 5/18* | (2006.01) |
| *C09D 175/08* | (2006.01) |

(52) U.S. Cl.
CPC .............. *C08G 18/12* (2013.01); *B32B 27/40* (2013.01); *B32B 37/025* (2013.01); *C08G 18/4018* (2013.01); *C08G 18/4238* (2013.01); *C08G 18/4854* (2013.01); *C08G 18/7664* (2013.01); *C08J 5/18* (2013.01); *C09D 175/08* (2013.01); *C08J 2375/08* (2013.01)

(58) Field of Classification Search
CPC ....... B32B 27/40; B32B 37/025; C08G 18/10; C08G 18/12; C08G 18/4018; C08G 18/4238; C08G 18/4854; C08G 18/7664; C08G 18/7671; C08J 5/18; C08J 2375/08; C09D 175/06; C09D 175/08; D06N 3/14
See application file for complete search history.

(56) References Cited

U.S. PATENT DOCUMENTS

| | | | |
|---|---|---|---|
| 2007/0169887 A1 | 7/2007 | Kanagawa et al. | |
| 2010/0068499 A1 | 3/2010 | Kanagawa et al. | |
| 2016/0215186 A1* | 7/2016 | Ninomiya | .............. C09J 175/08 |
| 2016/0326408 A1* | 11/2016 | Suen | ....................... C08L 51/06 |
| 2018/0298254 A1* | 10/2018 | Matsuda | ............. C08G 65/2615 |
| 2019/0055339 A1 | 2/2019 | Kanagawa | |

FOREIGN PATENT DOCUMENTS

| | | |
|---|---|---|
| JP | 07-229072 A | 8/1995 |
| JP | 2003-306523 A | 10/2003 |
| JP | 2005-273131 A | 10/2005 |
| JP | 2007-063510 A | 3/2007 |
| TW | 201028450 A | 8/2010 |
| WO | 00/43433 A1 | 7/2000 |
| WO | 2005/083173 A1 | 9/2005 |
| WO | 2008/065920 A1 | 6/2008 |
| WO | 2017/104266 A1 | 6/2017 |

OTHER PUBLICATIONS

Extended European Search Report issued in corresponding European Patent Application No. 18859790.0-1107, dated Dec. 18, 2020.
International Search Report issued in corresponding International Patent Application No. PCT/JP2018/029887, dated Nov. 6, 2018, with English translation.

* cited by examiner

*Primary Examiner* — John M Cooney
(74) *Attorney, Agent, or Firm* — McDermott Will & Emery LLP

(57) ABSTRACT

An object to be achieved by the present invention is to provide a method for producing an artificial leather on a practically usable level without using an organic solvent and without requiring a crosslinking step for a crosslinking agent. The present invention provides a method for producing an artificial leather having a cured product layer of a moisture-curing urethane hot-melt resin composition, wherein the moisture-curing urethane hot-melt resin composition contains a urethane prepolymer having an isocyanate group and does not contain a crosslinking agent having a hydroxyl group and/or an amino group, the method including applying the moisture-curing urethane hot-melt resin composition to a substrate at a coating weight of 0.03 to 0.5 kg/m$^2$ so as to form a cured product layer of the moisture-curing urethane hot-melt resin composition.

4 Claims, No Drawings

METHOD FOR MANUFACTURING ARTIFICIAL LEATHER

CROSS REFERENCE TO RELATED APPLICATIONS

This patent application is the U.S. National Phase under 35 U.S.C. § 371 of International Application No. PCT/JP2018/029887, filed on Aug. 9, 2018, which claims the benefit of Japanese Patent Application No. 2017-183663, filed on Sep. 25, 2017, the entire contents of each are hereby incorporated by reference.

TECHNICAL FIELD

The present invention relates to a method for producing an artificial leather.

BACKGROUND ART

Artificial leathers using a urethane resin as a raw material are widely used in the production of car interior trims, furniture, moisture-permeable waterproof clothing, and the like. The urethane resin is generally used in the form of an N,N-dimethylformamide (hereinafter, abbreviated to "DMF") solution of polyurethane. However, the European countries and China are more strictly regulating the use of DMF, and therefore a reduction of the use of DMF in the resin and a change of the resin to that using no solvent are urgently required.

Further, the artificial leather is generally formed in the form of a laminated article essentially having a fabric base, an intermediate layer, and a skin layer, and the method for producing the artificial leather generally has steps in which a skin layer is prepared on release paper, and an intermediate layer is formed on the skin layer, and the intermediate layer is laminated on a fabric base using a bonding agent, and further each step requires drying, and therefore there is a problem in that the process for the production is very complicated.

For solving the problem, as a method of simplifying the process, for example, a method for producing an artificial leather has been disclosed in which a mixture solution containing a polyurethane resin solution and a polyisocyanate crosslinking agent is applied onto release paper and dried, and the resultant film immediately after being dried is heat-bonded to a fabric base (see, for example, PTL 1). By this method, a unified form with a layer having serving as both of, so-called, an intermediate layer and a skin layer can be formed, and thus the method has an advantage from the viewpoint of simplifying the process. However, the use of a crosslinking agent and an organic solvent is indispensable to the method, and therefore a crosslinking step for the crosslinking agent and a drying step for the organic solvent require a prolonged period of time, making it difficult to obtain an artificial leather on a practically usable level in a short time.

CITATION LIST

Patent Literature

PTL 1: JP-A-7-229072

SUMMARY OF INVENTION

Technical Problem

An object to be achieved by the present invention is to provide a method for producing an artificial leather on a practically usable level without using an organic solvent and without requiring a crosslinking step for a crosslinking agent.

Solution to Problem

In the present invention, there is provided a method for producing an artificial leather having a cured product layer of a moisture-curing urethane hot-melt resin composition, wherein the moisture-curing urethane hot-melt resin composition contains a urethane prepolymer having an isocyanate group and does not contain a crosslinking agent having a hydroxyl group and/or an amino group, the method includes applying the moisture-curing urethane hot-melt resin composition to a substrate at a coating weight of 0.03 to 0.5 kg/m$^2$ so as to forma cured product layer of the moisture-curing urethane hot-melt resin composition.

Advantageous Effects of Invention

In the method for producing an artificial leather of the invention, the environment-friendly solvent-free resin composition is used, and therefore a drying step for an organic solvent is not needed, and further a crosslinking agent is not used, and hence a crosslinking step therefor is not required, and it is possible to achieve a reduction of the production time for an artificial leather being on a practically usable level. Further, the intermediate layer and the skin layer are unified into one layer using the cured product layer of the moisture-curing urethane hot-melt resin composition, and therefore it is possible to achieve a saving of the power used for the production process for the artificial leather.

DESCRIPTION OF EMBODIMENTS

The method for producing an artificial leather of the invention is a method for producing an artificial leather having a cured product layer of a moisture-curing urethane hot-melt resin composition, and, in the method, it is necessary that the moisture-curing urethane hot-melt resin composition contains a urethane prepolymer having an isocyanate group and does not contain a crosslinking agent having a hydroxyl group and/or an amino group, and that the cured product layer of the moisture-curing urethane hot-melt resin composition is formed by applying the moisture-curing urethane hot-melt resin composition to a substrate at a coating weight of 0.03 to 0.5 kg/m$^2$.

The moisture-curing urethane hot-melt resin composition contains a urethane prepolymer having an isocyanate group as an essential component, and does not contain a crosslinking agent having a hydroxyl group and/or an amino group. When using the crosslinking agent, a crosslinking step is needed, so that a reduction of the production time for the artificial leather cannot be achieved.

Examples of the crosslinking agents include crosslinking agents having a hydroxyl group, such as a polyether polyol, a polycarbonate polyol, a polyester polyol, a polyacryl polyol, and a dimer diol; and crosslinking agents having an amino group, such as ethylenediamine, tetramethylenediamine, hexamethylenediamine, diethylenetriamine, triethylenetetramine, hydrazine, piperazine, diaminodiphenylmethane, tolylenediamine, xylylenediamine, isophoronediamine, and norbornanediamine.

As the urethane prepolymer having an isocyanate group, for example, a reaction product of a polyol (a) and a polyisocyanate (b) can be used.

As the polyol (a), for example, there can be used a polyester polyol, a polyether polyol, a polycarbonate polyol, a polyacryl polyol, a polyolefin polyol, or the like. These polyols may be used individually or in combination. Of these, a polyether polyol is preferably used because it is reacted with the above-mentioned hot-melt urethane prepolymer (A), so that an artificial leather having excellent texture can be obtained.

As the polyether polyol, for example, there can be used polyoxyethylene polyol, polyoxypropylene polyol, polyoxytetramethylene polyol, polyoxyethylene polyoxypropylene polyol, polyoxyethylene polyoxytetramethylene polyol, polyoxypropylene polyoxytetramethylene polyol, or the like. These polyether polyols may be used individually or in combination.

From the viewpoint of the mechanical strength of the obtained film and the texture, the polyol (a) preferably has a number average molecular weight in the range of 500 to 10,000, more preferably in the range of 700 to 7,000. The number average molecular weight of the polyol (a) indicates a value as measured by a gel permeation chromatography (GPC) method.

The polyol (a) and a chain extender may be used in combination if necessary. In the invention, there is a possibility that, when producing the urethane prepolymer, an unreacted substance of the polyol (a) or the chain extender remains in the composition, but such an unreacted substance is not considered as a crosslinking agent.

As the chain extender, for example, there can be used a chain extender having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, or hydrazine; or a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, or trimethylolpropane. These chain extenders may be used individually or in combination.

As the polyisocyanate (b), for example, there can be used an aromatic polyisocyanate, such as phenylene diisocyanate, tolylene diisocyanate, diphenylmethane diisocyanate, naphthalene diisocyanate, polymethylene polyphenyl polyisocyanate, or carbodiimidated diphenylmethane polyisocyanate; or an aliphatic or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate. These polyisocyanates may be used individually or in combination. Of these, from the viewpoint of obtaining excellent transparency, resistance to inclusion of bubbles, texture, and mechanical strength even when the intermediate layer and the skin layer are unified into one layer using the cured product layer of the moisture-curing urethane hot-melt resin composition, an aromatic polyisocyanate is preferably used, and diphenylmethane diisocyanate is more preferably used.

With respect to the method for producing the urethane prepolymer, for example, the urethane prepolymer can be produced by charging the polyol (a) and, if necessary, the chain extender into a reaction vessel containing the polyisocyanate (b), and subjecting the resultant mixture to reaction under conditions such that the isocyanate group of the polyisocyanate (b) is excess with respect to the hydroxyl group of the polyol (a) and the like.

From the viewpoint of the mechanical strength, the isocyanate group content of the urethane prepolymer (hereinafter, referred to simply as "NCO %") is preferably in the range of 1.1 to 5% by mass, more preferably in the range of 1.5 to 4% by mass. The NCO % of the urethane prepolymer indicates a value as measured by a potentiometric titration method in accordance with JIS K1603-1:2007.

The moisture-curing urethane hot-melt resin composition used in the invention contains the urethane prepolymer and does not contain the crosslinking agent, but, if necessary, may contain an additional additive.

With respect to the above-mentioned additional additive, for example, there can be used a urethane-forming reaction catalyst, a silane coupling agent, a thixotropic agent, an antioxidant, a plasticizer, a filler, a wax, and the like. These additives may be used individually or in combination.

Next, the method for producing an artificial leather of the invention is described below.

In the method for producing an artificial leather of the invention, the cured product layer of the moisture-curing urethane hot-melt resin composition is formed by applying the moisture-curing urethane hot-melt resin composition to a substrate at a coating weight of 0.03 to 0.5 kg/m$^2$.

It is necessary that the coating weight of the moisture-curing urethane hot-melt resin composition is in the range of 0.03 to 0.5 kg/m$^2$. By virtue of the coating weight in this range, even when the intermediate layer and the skin layer are unified into one layer using the cured product layer of the moisture-curing urethane hot-melt resin composition, excellent transparency, resistance to inclusion of bubbles, texture, and mechanical strength can be obtained. From the viewpoint of further improving these properties, the coating weight is preferably in the range of 0.1 to 0.3 kg/m$^2$, more preferably 0.1 to 0.2 kg/m$^2$.

Specifically, for example, there can be mentioned (i) a method in which the moisture-curing urethane hot-melt resin composition is applied onto a release substrate, and then the applied surface is put on a substrate other than a release substrate, and subsequently the moisture-curing urethane hot-melt resin composition is moisture-cured to form a cured product layer of the moisture-curing urethane hot-melt resin composition on the substrate other than a release substrate; and (ii) a method in which the moisture-curing urethane hot-melt resin composition is applied to a substrate other than a release substrate, and subsequently the moisture-curing urethane hot-melt resin composition is moisture-cured to form a cured product layer of the moisture-curing urethane hot-melt resin composition on the substrate other than a release substrate.

As the above-mentioned substrate other than a release substrate, for example, there can be used nonwoven fabric, woven fabric, or knitted fabric, each formed from a polyester fiber, a polyethylene fiber, a nylon fiber, an acrylic fiber, a polyurethane fiber, an acetate fiber, a rayon fiber, a polylactate fiber, cotton, linen, silk, wool, a glass fiber, a carbon fiber, a mixed fiber thereof, or the like; the above-mentioned nonwoven fabric which is impregnated with a resin, such as a polyurethane resin; the above-mentioned nonwoven fabric which has further formed thereon a porous layer; a resin substrate, such as a thermoplastic urethane (TPU), or the like.

With respect to the method for applying the moisture-curing urethane hot-melt resin composition to the release substrate or the substrate other than a release substrate, for example, there can be mentioned a method using an applicator, a roll coater, a spray coater, a T-die coater, a knife coater, a comma coater, or the like.

After the application, for the purpose of maturing (moisture-cure) of the moisture-curing urethane hot-melt resin composition, for example, postcure may be conducted at a temperature of 20 to 80° C. for 0.5 to 7 days.

As described above, in the method for producing an artificial leather of the invention, the environment-friendly solvent-free resin composition is used, and therefore a drying step for an organic solvent is not needed, and further a crosslinking agent is not used, and hence a crosslinking step therefor is not required, and it is possible to achieve a reduction of the production time for an artificial leather. Further, the intermediate layer and the skin layer are unified into one layer using the cured product layer of the moisture-curing urethane hot-melt resin composition, and therefore it is possible to achieve a saving of the power used for the production process for the artificial leather.

EXAMPLES

Hereinbelow, the present invention will be described in more detail with reference to the following Examples.

[Synthesis Example 1] Synthesis of a Urethane Prepolymer (A-1)

Into a reaction vessel equipped with a thermometer, a stirrer, an inert gas introducing inlet, and a reflux condenser were charged 250 parts by mass of polyoxytetramethylene glycol (number average molecular weight: 1,000) and 250 parts by mass of polyester polyol (reaction product of 1,6-hexanediol and adipic acid; number average molecular weight: 2,000), and the resultant mixture was dehydrated under reduced pressure conditions until the water content became 0.05% by mass or less.

Then, 133 parts by mass of 4,4'-diphenylmethane diisocyanate was added and the temperature of the resultant mixture was increased to 110° C., and the mixture was subjected to reaction for about 2 hours until the isocyanate group content became constant, obtaining a urethane prepolymer (A-1).

Example 1

The urethane prepolymer (A-1) was melted at 110° C., and then applied onto release paper set in a roll coater at a coating weight of 0.2 kg/m², and then the release paper was laminated on nonwoven fabric impregnated with a urethane resin (hereinafter, referred to simply as "impregnated nonwoven fabric"), which had a tacky state, and allowed to stand in an atmosphere at a temperature of 23° C. and at a humidity of 50% RH for 2 days to obtain an artificial leather.

Examples 2 to 5 and Comparative Examples 1 and 2

An artificial leather was obtained in the same manner as in Example 1 except that the coating weight and/or substrate was changed as shown in Tables 1 and 2.

Example 6

The urethane prepolymer (A-1) was melted at 110° C., and then applied onto a thermoplastic urethane film (hereinafter, referred to simply as "TPU") set in a roll coater at a coating weight of 0.2 kg/m², and then allowed to stand in an atmosphere at a temperature of 23° C. and at a humidity of 50% RH for 2 days to obtain an artificial leather.

Comparative Example 3

Into a reaction vessel equipped with a thermometer, a stirrer, an inert gas introducing inlet, and a reflux condenser were charged 100 parts by mass of polyoxytetramethylene glycol (number average molecular weight: 1,000) and 100 parts by mass of polyester polyol (reaction product of 1,6-hexanediol, neopentyl glycol and adipic acid; number average molecular weight: 2,000), and the resultant mixture was dehydrated under reduced pressure conditions until the water content became 0.05% by mass or less.

Then, 99 parts by mass of 4,4'-xylylene diisocyanate was added and the temperature of the resultant mixture was increased to 80° C., and the mixture was subjected to reaction for about 6 hours until the isocyanate group content became constant, obtaining a urethane prepolymer (A-2).

Then, the urethane prepolymer (A-2) was melted at 110° C., and then polypropylene glycol (number average molecular weight: 1,000; hereinafter, abbreviated to "PPG") was mixed therewith so that the amount of the polypropylene glycol was 20 parts by mass, relative to 100 parts by mass of the urethane prepolymer (A-2), and the resultant mixture was applied onto release paper set in a roll coater at a coating weight of 0.2 kg/m², and then the release paper was laminated on nonwoven fabric impregnated with a urethane resin, which had a tacky state, and allowed to stand in an atmosphere at a temperature of 23° C. and at a humidity of 50% RH for 5 days to obtain an artificial leather.

[Evaluation Method for Appearance of an Artificial Leather]

With respect to the artificial leathers obtained in the Examples and Comparative Examples, the appearance was visually observed, and evaluated as follows.

"○": The cured product layer of the moisture-curing urethane hot-melt resin composition is so transparent that the underlying substrate can be clearly seen.

"X": The cured product layer of the moisture-curing urethane hot-melt resin composition is opaque.

[Evaluation Method for Texture]

The artificial leathers obtained in the Examples and Comparative Examples were individually touched and folded or wrinkled, and evaluated as follows.

"○": Soft, and voluminous feeling.

"X": Hard, or no voluminous feeling.

[Evaluation Method for Flexing Properties]

With respect to the artificial leathers obtained in the Examples and Comparative Examples, using "MIT flexing test machine", manufactured by Toyo Seiki Seisaku-Sho, Ltd., a flexing test with a frequency of 100,000 was conducted at room temperature (23° C.). An artificial leather such that no crack was formed in the surface was rated "○", and an artificial leather such that a crack was formed during the test was rated "X".

[Evaluation Method for Peel Strength]

With respect to the artificial leathers obtained in the Examples and Comparative Examples, a hot-melt fabric tape was bonded onto the cured product layer of the moisture-curing urethane hot-melt resin composition at 130° C. for 5 seconds, and then, using Tensilon (Tensilon universal testing machine "RTC-1210A", manufactured by Orientec Co., Ltd.), a peel strength was measured under conditions at a crosshead speed of 200 mm/minute and taken as a peel strength in an ordinary state. An artificial leather having a peel strength of 2 kg/cm or more was rated as "◯", and an artificial leather other than the above was rated as "X".

TABLE 1

|  | Example 1 | Example 2 | Example 3 | Example 4 |
|---|---|---|---|---|
| Moisture-curing urethane hot-melt resin composition | (A-1) | (A-1) | (A-1) | (A-1) |
| Coating weight (kg/m$^2$) | 0.2 | 0.5 | 0.03 | 0.2 |
| Application method | (i) | (i) | (i) | (i) |
| Substrate other than release substrate | Impregnated nonwoven fabric | Impregnated nonwoven fabric | Impregnated nonwoven fabric | Woven fabric |
| Aging time | 2 Days | 2 Days | 2 Days | 2 Days |
| Appearance | ◯ | ◯ | ◯ | ◯ |
| Texture | ◯ | ◯ | ◯ | ◯ |
| Flexing properties | ◯ | ◯ | ◯ | ◯ |
| Peel strength | ◯ | ◯ | ◯ | ◯ |

TABLE 2

|  | Example 5 | Example 6 | Comparative Example 1 | Comparative Example 2 | Comparative Example 3 |
|---|---|---|---|---|---|
| Moisture-curing urethane hot-melt resin composition | (A-1) | (A-1) | (A-1) | (A-1) | (A-2) Crosslinking agent PPG |
| Coating weight (kg/m$^2$) | 0.2 | 0.2 | 0.02 | 0.6 | 0.2 |
| Application method | (i) | (ii) | (i) | (i) | (i) |
| Substrate other than release substrate | TPU | TPU | Impregnated nonwoven fabric | Impregnated nonwoven fabric | Impregnated nonwoven fabric |
| Aging time | 2 Days | 2 Days | 2 Days | 2 Days | 5 Days |
| Appearance | ◯ | ◯ | ◯ | ◯ | ◯ |
| Texture | ◯ | ◯ | X | X | ◯ |
| Flexing properties | ◯ | ◯ | ◯ | ◯ | ◯ |
| Peel strength | ◯ | ◯ | ◯ | X | X |

In Examples 1 to 6 which are according to the present invention, an artificial leather was able to be produced in a short time without using an organic solvent and without requiring a crosslinking step for a crosslinking agent. Further, the obtained artificial leather had excellent appearance, texture, flexing properties, and peel strength and was on a practically usable level.

On the other hand, in Comparative Example 1 which corresponds to an embodiment in which the coating weight of the moisture-curing urethane hot-melt resin composition is less than the range defined in the invention, the voluminous feeling was unsatisfactory, and thus an artificial leather on a practically usable level was not able to be obtained.

In Comparative Example 2 which corresponds to an embodiment in which the coating weight of the moisture-curing urethane hot-melt resin composition is more than the range defined in the invention, the texture was hard and the peel strength was low, and thus an artificial leather on a practically usable level was not able to be obtained.

In Comparative Example 3 which corresponds to an embodiment in which the moisture-curing urethane hot-melt resin composition containing a crosslinking agent having a hydroxyl group is used, the crosslinking reaction for the crosslinking agent required a long time, and the aging time for the moisture-curing urethane hot-melt resin composition needed 5 days.

The invention claimed is:

1. A method for producing an artificial leather having a cured product layer of a moisture-curing urethane hot-melt resin composition,
   wherein the moisture-curing urethane hot-melt resin composition contains a urethane prepolymer having an isocyanate group, wherein the urethane prepolymer contains polyether polyol as polyol and polyoxytetramethylene glycol only as the polyether polyol, and the moisture-curing urethane hot-melt resin composition does not contain a crosslinking agent having a hydroxyl group and/or an amino group,
   the method comprising applying the moisture-curing urethane hot-melt resin composition to a substrate at a coating weight of 0.03 to 0.3 kg/m$^2$ so as to form a cured product layer of the moisture-curing urethane hot-melt resin composition.

2. The method for producing an artificial leather according to claim 1, wherein the cured product layer of the moisture-curing urethane hot-melt resin composition is formed by (i) applying the moisture-curing urethane hot-melt resin composition onto a release substrate and then putting the applied surface on a substrate other than a release substrate, or by (ii) applying the moisture-curing urethane hot-melt resin composition to a substrate other than a release substrate.

3. The method for producing an artificial leather according to claim 1, wherein the urethane prepolymer having an isocyanate group is one produced by a method where diphenylmethane diisocyanate is used as a raw material.

4. The method for producing an artificial leather according to claim 2, wherein the urethane prepolymer having an isocyanate group is one produced by a method where diphenylmethane diisocyanate is used as a raw material.

\* \* \* \* \*